United States Patent [19]

Kinoshita

[11] Patent Number: 4,903,075
[45] Date of Patent: Feb. 20, 1990

[54] APPARATUS FOR MAKING CONTACT PRINTS

[75] Inventor: Tsutomu Kinoshita, Kyoto, Japan

[73] Assignee: Dainippon Screen Mfg. Co., Ltd., Japan

[21] Appl. No.: 224,804

[22] Filed: Jul. 27, 1988

[30] Foreign Application Priority Data

Jul. 29, 1987 [JP] Japan .................. 62-116313[U]

[51] Int. Cl.4 .............................. G03B 27/20
[52] U.S. Cl. ...................... 355/94; 355/73; 355/76
[58] Field of Search ............ 355/87, 91, 93, 94, 355/73, 76

[56] References Cited

U.S. PATENT DOCUMENTS 4,486,094 12/1984 Schoen et al. .................. 355/76

Primary Examiner—Monroe H. Hayes
Attorney, Agent, or Firm—Ostrolenk, Faber, Gerb & Soffen

[57] ABSTRACT

An apparatus for making contact prints, the apparatus including a frame having a transparent plate, and a pair of frame carriers for supporting the frame at opposite sides of the printing box such that the frame is placeable over the printing plate in an optically sealed manner, each of the frame carrier including a stop means for anchoring the frame carrier at a predetermined position alongside the printing box.

2 Claims, 4 Drawing Sheets

APPARATUS FOR MAKING CONTACT PRINTS

BACKGROUND OF THE INVENTION

1. Field of the Invention

The present invention relates to an apparatus for making contact prints, and more particularly to an apparatus which makes prints by placing a sensitive sheet in contact with a negative and exposing the same to light through the negative. Hereinafter, the apparatus will be referred to as the "printing apparatus".

2. Description of the Prior Art

There are a variety of printing apparatus known in the art, among which are those disclosed in Japanese Patent Publication (examined) No. 61-38455 and Utility Model Publication (unexamined) No. 56-10624. The basic structure of the present invention is in common with these known apparatus, and to explain the background of the present invention, it will be described by reference to prior art FIG. 5 herein.

The example in the illustration is a vacuum type device, which comprises a printing box 1, a printing plate 2 having a soft sheet, and a frame 4 pivotally connected to the box 1 by hinges 3, the frame 4 including a transparent plate 5 such as glass. The printing plate 2 is provided with a packing 7 at its periphery, whereby when the frame 4 is placed over the printing plate 2, the optical seal therebetween is secured. The reference numeral 11 denotes a handle.

In addition to the hinges 3, the frame 4 and the box 1 are connected to each other by gas springs 8, whereby the opening and closing of the frame 4 is facilitated. When the frame 4 is placed over the printing plate 2, a confined space is formed therebetween. The air inside the confined space is removed by a vacuum pump (not shown) through bores 9. There is provided a source of light 10 above the frame 4.

A sensitive sheet is placed on the printing plate 2, and a negative is overlaid on the sensitive sheet. The frame 4 is placed over the printing plate 2. Then the vacuum pump is driven to evacuate the air from the confined space between the frame 4 and the printing plate 2, thereby securing a tight contact between the sensitive sheet and the negative at vacuum. Then the source of light 10 is illuminated, thereby projecting the image in the film onto the sensitive sheet.

A disadvantage of this type of printing apparatus is that the inner surface of the transparent plate 5 is liable to become stained with ink, an adhesive or dirt floating in air. A stain on the transparent plate 5 causes a pinhole and spoils the formation of an image. Consequently, a constant care is required such as by wiping or applying a cleanser, to keep the inner surface of the transparent plate 5 clean. On the other hand, a stain on the outer surface of the transparent plate 5 does not so seriously affect the formation of an image as on the inner surface, because of the fact that light is diffused during passage through the transparent plate 5 (normally 5 mm thick). Any stain on the outer surface has only to be brushed. No troublesome taking-care is necessary.

An elaborate maintenance procedure is required for keeping the inner surface of the transparent plate 5 clean. Particularly a large-scale apparatus will require a lot of labor; for example, when the transparent plate 5 is as large as 1.5 m$^2$ in area, the lower portion of the transparent plate 5 is out of reach from the front side (indicated by arrow (A)) of the apparatus. As a result, the alternative way is to clean the transparent plate 5 from either side indicated by arrow (B). However, when the apparatus is crowded by other office furniture, access to the sides of the device is difficult if not impossible.

OBJECTS AND SUMMARY OF THE INVENTION

The present invention aims to provide a printing apparatus which solves the above problems in the known apparatus discussed above. Thus an object of the present invention is to provide a printing apparatus which makes it easy to place the the transparent plate within reach of an operator, thereby facilitating the constant taking-care of the transparent plate.

This object is achieved by providing a printing apparatus having a printing box, a printing plate, and a frame having a transparent plate, the apparatus further comprising a pair of frame carriers for supporting the frame, the frame carriers being provided on opposite sides of the printing box such that the frame is placeable over the printing plate in an optically sealed manner, each of the frame carrier including a stop means for anchoring the frame carrier at a predetermined position alongside the printing box.

Other objects and advantages of the present invention will become more apparent from the following detailed description, when taken in conjunction with the accompanying drawings which show, for the purpose of illustration only, one embodiment in accordance with the present invention.

DETAILED DESCRIPTION OF THE INVENTION

Figure 1:
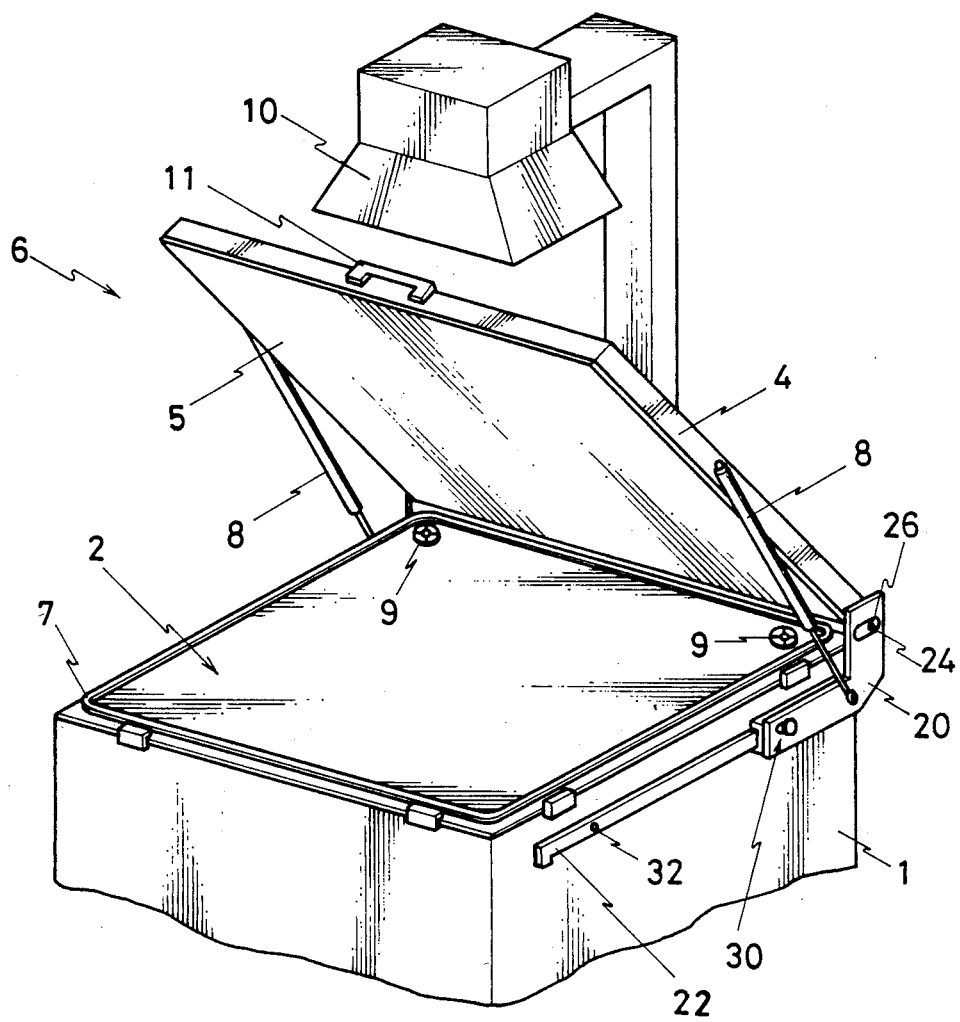
FIG. 1 is a perspective view showing a main section of a printing apparatus according to the present invention.
Figure 2:
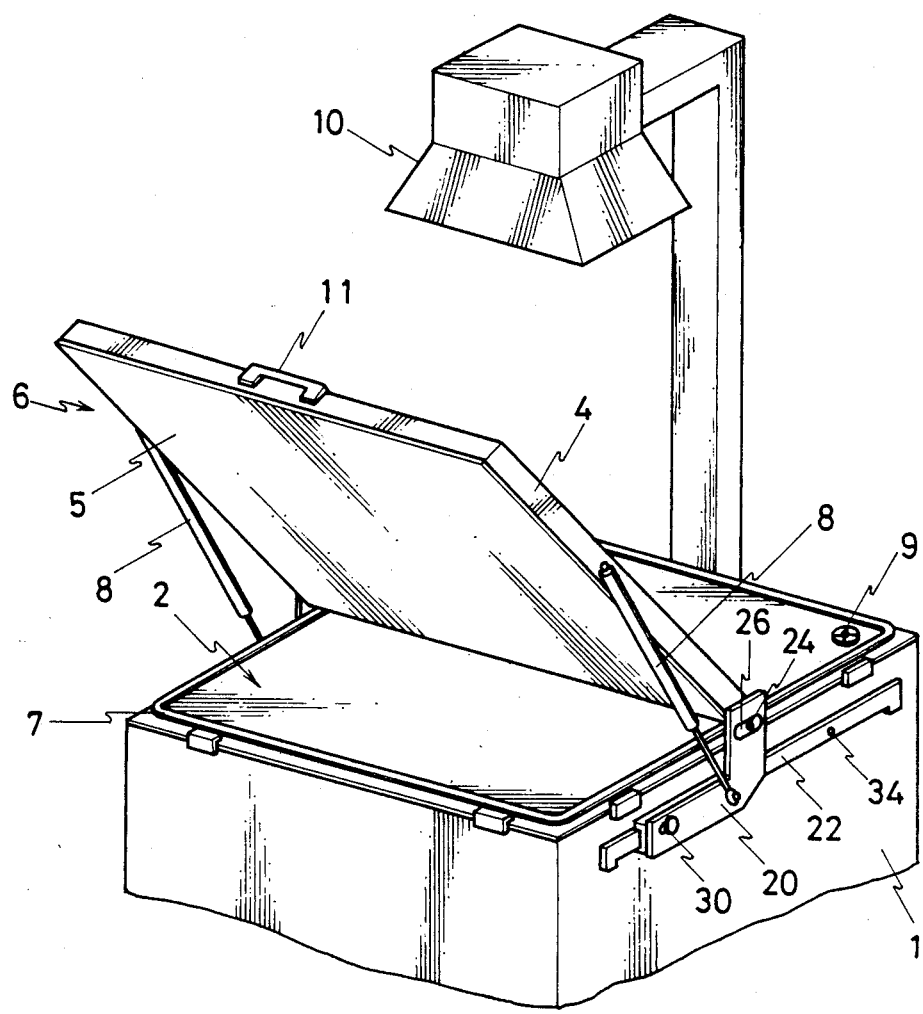
FIG. 2 is a perspective view showing the apparatus of FIG. 1, wherein the frame is displaced toward the front of the apparatus.
Figure 4:
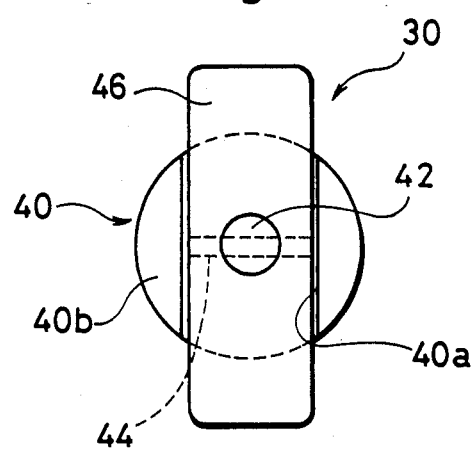
FIG. 4 is a front view of the frame carrier of FIG. 3.
Figure 5:
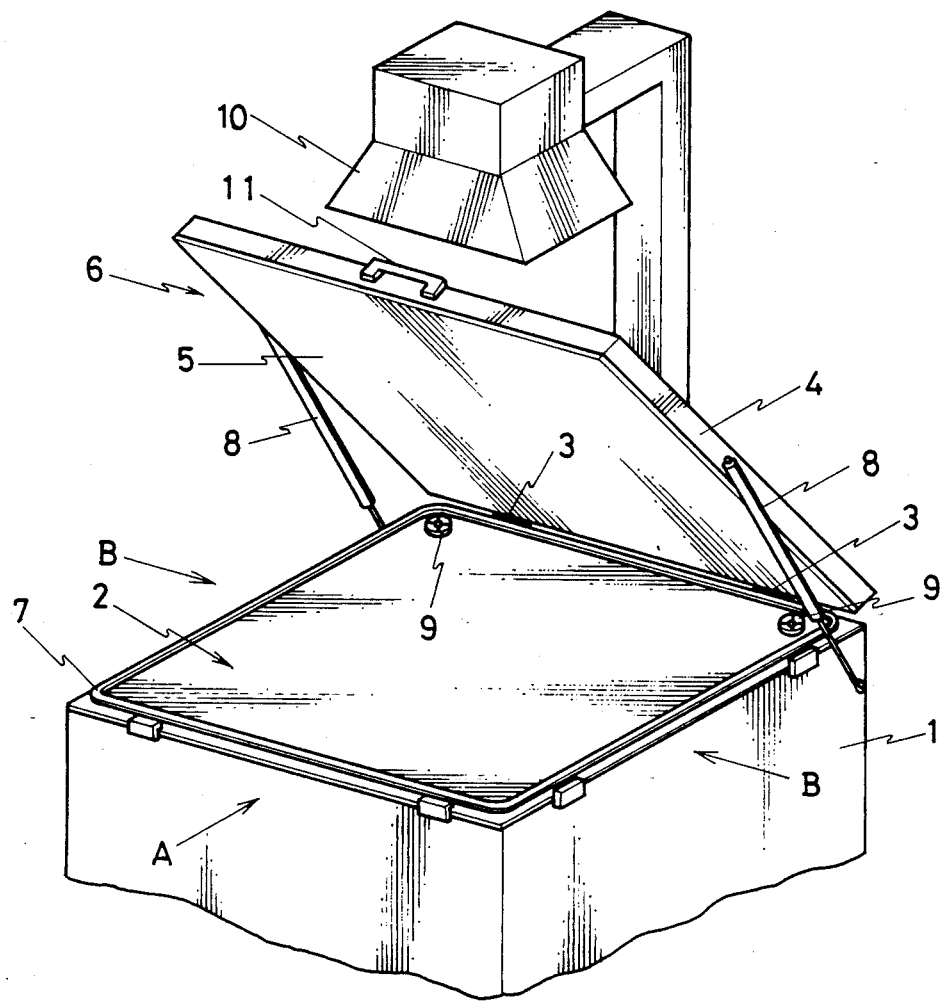
FIG. 5 is a perspective view showing the basic structure of known printing apparatus.

Referring to FIGS. 1 and 2, the illustrated embodiment of the present invention is basically identical in structure to the known apparatus shown in FIG. 5. Throughout FIGS. 1 to 4 like reference numerals denote like compounds in FIG. 5.

The embodiment of the present invention is different from the known apparatus of FIG. 5, in that the frame 4 is supported by frame carriers 30, which are secured to the box 1. In the apparatus of FIG. 5, the frame 4 is directly connected to the printing box 1 by means of the gas springs 8. The frame carrier 30 includes a rail 22 and a slider 20 slidable on and along the rail 22. The frame 4 is supported freely of the box 1, unlike the embodiment of FIG. 5, in which the frame 4 is hinged thereto. The frame 4 has dowels 24 at the lower rim, and is supported on the frame carrier 30 by fitting the dowels 24 in receptive holes 24 of the sliders 20.

Figure 3:
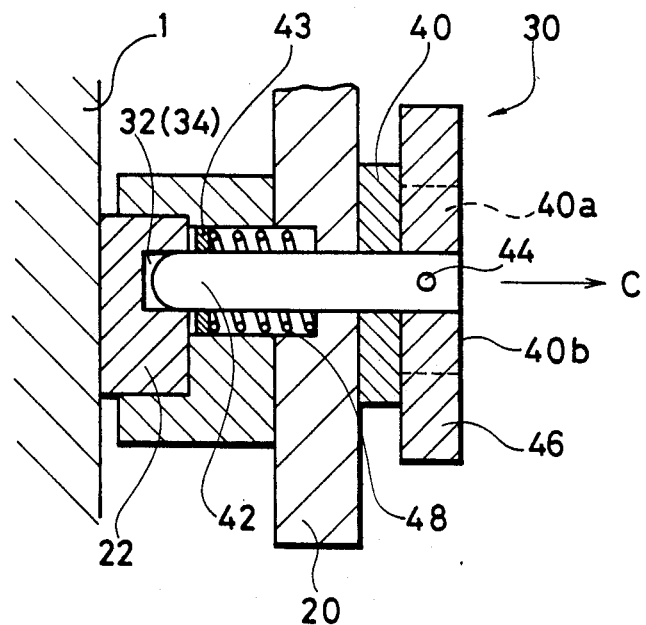
FIG. 3 is a cross-sectional side view showing the frame carrier.

Referring to FIGS. 3 and 4, the frame carrier 30 will be described in greater detail.

Each rail 22 is provided with anchorage apertures 32 and 34 spaced from each other, in which the respective slider 20 is anchored by means of a lock pin 42. The lock pin 42 has a knob 46 fixed thereto by a pin 44, and is insertable in the anchorage apertures 32 or 34 under the urge of a coil spring 48. The reference numeral 40 denotes a washer. The locking and unlocking is facilitated by lock aid members 40, each of which is located between the slider 20 and the knob 46. As best shown in FIG. 4, the lock aid member 40 is provided with convex sections 40b and a concave section 40a therebetween. When the knob 46 fits in the concave section 40a, the lock pin 42 is inserted in the anchorage aperture 32 or 34 under the action of the coil spring 48, whereas when the knob 46 rides on the convex sections 40b, the lock pin 42 is released from the anchorage aperture 32 or 34. FIG. 3 shows that the lock pin 42 is anchored in the aperture 32 or 34; at this stage, the knob 46 fits in the concave section 40a. The knob 46 is pulled in the direction of arrow (C) (FIG. 3), and is rotated in either of the clockwise or counter-clockwise direction until it rides on the convex sections 40b. By releasing the lock pins 42 from the apertures 32 or 34, the sliders 20 are readied for sliding along the rails 22. If the operator wants to anchor the frame carriers 30 automatically to desired apertures 32 or 34, the sliders 20 are moved with the lock pins 42 dragging on the rails 22. In this state the knobs 46 only slightly fit in the concave sections 40a of the respective lock aid members 40. When the sliders 20 reach the desired apertures 32 or 34, the lock pins 42 are caused to fit therein under the action of the coil springs 48.

In this way the transparent plate 5 is readily moved to and from the front side of the apparatus. When the rear side of the transparent plate 5 is to be cleaned, the sliders 20 are released from anchorage at the apertures 34, and the transparent plate 5 is pulled with the handle 11 so as to locate it within reach of the operator's hands. When the sliders 20 are anchored at the apertures 32, the transparent plate 5 is within reach, and is accessible for being cleaned. When the cleaning is finished, the transparent plate 5 is returned to its original position shown in FIG. 1.

When the apparatus is very large, a pneumatic cylinder or any other power driving means may be employed instead of the gas springs 8.

What is claimed is:

1. An apparatus for making contact prints, the apparatus comprising a printing box, a printing plate mounted to the printing box, a frame including a transparent plate, a pair of frame carriers for supporting the frame, the frame carriers disposed at opposite sides of the printing box such that the frame is placeable over the printing plate in an optically sealed manner, each of the frame carriers comprising a connecting rod, a slider, a rail and a stop means for anchoring the slider at a predetermined position along the rail, the connecting rod connecting the frame to the slider, and the slider being slidable on and along the rail.

2. An apparatus as defined in claim 1, wherein the stop means comprises a spring-loaded lock pin having a knob, a lock aid means located between the knob and the slider, the lock aid means having convex sections and a concave section, the knob being selectively placeable on the convex sections or on the concave section, the concave section being effective to locate the knob such as to place the lock pin in a locking position and the convex sections being effective to raise the knob such as to place the lock pin in an unlocking position.

* * * * *